(12) United States Patent
Yocom et al.

(10) Patent No.: US 6,379,584 B1
(45) Date of Patent: Apr. 30, 2002

(54) LONG PERSISTENCE ALKALINE EARTH SULFIDE PHOSPHORS

(75) Inventors: Perry Niel Yocom, Princeton, NJ (US); Diane Zaremba, Fairless Hills, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/417,940

(22) Filed: Oct. 13, 1999

Related U.S. Application Data

(60) Provisional application No. 60/125,875, filed on Mar. 24, 1999.

(51) Int. Cl.$^7$ .......................... C09K 11/56; C09K 11/55
(52) U.S. Cl. ................................................ 252/301.45
(58) Field of Search ..................... 252/301.45

(56) References Cited

U.S. PATENT DOCUMENTS

| | | | |
|---|---|---|---|
| 4,725,344 A | 2/1988 | Yocom et al. | 204/192.15 |
| 4,755,324 A | 7/1988 | Lindmayer | 252/301.4 S |
| 4,877,994 A | 10/1989 | Fuyama et al. | 313/503 |
| 4,879,186 A | 11/1989 | Lindmayer | 252/301.4 S |
| 5,043,096 A | 8/1991 | Lindmayer | 252/301.4 S |
| 5,650,094 A | 7/1997 | Royce et al. | 252/301.4 F |
| 6,071,432 A | * 6/2000 | Yocom et al. | 252/301.4 S |

FOREIGN PATENT DOCUMENTS

| | | | |
|---|---|---|---|
| EP | 0030853 | | 6/1981 |
| JP | 56-82876 | * | 7/1981 |

OTHER PUBLICATIONS

International Search Report for PCT/US00/07929, filed Mar. 24, 2000.

* cited by examiner

*Primary Examiner*—C. Melissa Koslow
(74) *Attorney, Agent, or Firm*—William J. Burke

(57) ABSTRACT

A long persistence, orange-red emitting phosphor has the formula $AS:Eu_m Tr_n O_x X_y$ wherein A is an alkaline earth metal ion, Tr is one or more trivalent rare earth metal ions, X is a halide, m is an integer in the range 0.01 to 0.5 atomic percent, n is an integer in the range 0.3 to 0.5 atomic percent, x is an integer in the range 0.01 to 2.0 atomic percent, and y is an integer in the range 0.01 to 0.5 atomic percent. These phosphors are made by reacting an alkaline earth metal sulfate to form the corresponding sulfide, mixing with europium oxide and one or more trivalent rare earth metal oxides to dope the sulfate, mixing the doped alkaline earth metal sulfate with a hydrocarbon and powdered sulfur, heating to form the corresponding phosphor sulfide and mixing with a halide compound to form the corresponding oxyhalide sulfide phosphor. The persistence time of the phosphors can be improved by grinding the phosphor and refiring it in the presence of an ammonium halide.

11 Claims, No Drawings

LONG PERSISTENCE ALKALINE EARTH SULFIDE PHOSPHORS

This application claims the benefit of U.S. Provisional Application Serial No. 60/125,875 filed Mar. 24, 1999.

FIELD OF THE INVENTION

This invention relates to the preparation of long persistence alkaline earth sulfide phosphors. More particularly, this invention relates to a method of making alkaline earth sulfide phosphors using two firing steps to improve the persistence time.

BACKGROUND OF THE INVENTION

Long persistence phosphors that emit in the green, blue-green and blue colors have been known for some time. However, orange-red emitting long persistence phosphors have been discovered only recently. For example, Royce et al, U.S. Pat. No. 5,650,094 have disclosed rare earth activated divalent titanate phosphors, such as $CaTiO_3$ or $Ca—Zn—Mg—TiO_3$ that emit in the red portion of the spectrum, but the emission is visible for only a few minutes. Lindmayer, U.S. Pat. No. 5,043,096, reported a red-emitting alkaline earth metal sulfide based phosphor doped with two or more rare earths in the form of their oxides, and then fluxed with a halide, such as LiF. However, the resultant fired fluoride phosphor was highly sintered, and had to be ground to obtain a useful powdered phosphor. However, grinding degrades the emission, and thus the phosphor must be heated or annealed to repair the crystal defect damage. However, the emission performance is never fully restored. These phosphors are described as being useful as additives to paint formulations.

Other known long persistence alkaline earth metal sulfide phosphors that emit in the red, such as CaS:Eu:Tm have a short decay time of about 30 minutes.

Red and orange-emitting phosphors are highly desirable because they are easy to see in the dark, particularly in the event of a power failures, to show "EXIT" signs in a darkened room, and to make visible other safety devices and the like. Since red and orange are desirable, bright colors, they are also sought after for toys, sporting goods and the like.

SUMMARY OF THE INVENTION

We have found that alkaline earth sulfide phosphors doped with divalent europium, a halide ion and a controlled amount of an oxide ion, has long persistence and emits in the orange and red spectral regions.

These phosphors can be prepared by firing a mixture of alkaline earth sulfates activated with europium, one or more trivalent rare earth metal cations, a fluxing agent, a hydrocarbon and sulfur in a closed refractory crucible and heated to an initial temperature of about 300–400° C. to react the hydrocarbon and sulfur to form hydrogen sulfide and carbon; the temperature is then raised to about 900–1200° C. when the remaining carbon reacts with the alkaline earth sulfate to form the corresponding sulfide. Trivalent rare earths can be added to the mixture, and a halide is also added, either in the form of an alkaline earth halide or as an ammonium halide. All of the ingredients are then fired together.

Alternately, the halide can be added during a second firing step after the initial fired product has been ground. The second firing results in a less sintered product which requires less grinding to form a finely divided phosphor, and therefore has improved luminescent properties.

DETAILED DESCRIPTION OF THE INVENTION

The long persistence orange and red phosphors of the invention are prepared from alkaline earth metal sulfides, such as CaS, SrS and BaS, activated with europium (Eu). Both oxide and halide ions are also present. A trivalent rare earth ion, including erbium (Er), praseodymium (Pr), holmium (Ho) dysprosium (Dy), gadolinium (Gd), terbium (Tb) or neodymium (Nd) can also be added to regulate the amount of oxide retained in the host lattice by a strong bonding attraction between the trivalent ion and the oxide ion. This attraction prevents the reduction of the oxide ion concentration to levels that are too low to achieve long persistence in the phosphor emission.

These phosphors are prepared by forming a mixture of an alkaline earth metal sulfate, such as $SrSO_4$ doped with Eu, one or more trivalent rare earth metal ions including Er, Ho, Dy and Nd, to form a doped alkaline earth metal sulfate. This doped alkaline earth metal sulfate is mixed with a powdered hydrocarbon and powdered sulfur and fired.

Suitable hydrocarbons include polyethylene, polypropylene, paraffin or mineral oil.

The mixture is placed in a refractory crucible, such as one made of alumina, which is covered. The covered crucible is then heated slowly up to a temperature range of 300–400° C., when sulfur reacts with the hydrocarbon to produce hydrogen sulfide and carbon in accordance with the equation $$CH_2 + S \rightarrow C + H_2S$$

The temperature is increased to a range of 900–1200° C. when free carbon reacts with the alkaline earth sulfate to form the corresponding sulfide, in accordance with the equation $$SrSO_4:Eu:Tr + 3CH_2 + 3S \rightarrow SrS:Eu:Tr + 2CO + CO_2 + 3H_2S$$

wherein Tr is a trivalent rare earth metal ion. This firing can be carried out for from about 0.5 to 4 hours.

The halide, which can be fluoride, chloride, bromide or iodide, can be added in several ways; for example, an ammonium halide, such as ammonium chloride, ammonium bromide or ammonium iodide, or an alkaline earth metal halide, such as strontium chloride or barium chloride, can be added to the mixture and fired. However, since this results in a sintered mass which must be ground prior to use, preferably the halide is added in a second firing step, after grinding the doped alkaline earth metal sulfide product of the first firing. The second firing results in a material that is less sintered, which requires less grinding that reduces luminescent properties.

The degree of sintering of the phosphor depends on the firing temperature; the lower the temperature, the less sintering occurs.

To achieve a higher degree of persistence, a second firing is carried out at the same temperatures, but using less hydrocarbon and sulfur, and adding a halide compound such as ammonium chloride. The firing regime can be the same for both firings. The resultant phosphor has long persistence, i.e., up to two hours, and emits in the orange portion of the spectrum. This phosphor has the formula $$AS:Eu_m:Tr_n:O_xX_y$$

wherein A is an alkaline earth metal ion; Tr is one or more trivalent rare earth metal ions; X is a halide; m is an integer of 0.01 to 0.5 atomic percent; n is an integer of from 0.03 to 0.5 atomic percent; x is an integer of from 0.01 to 2.0 atomic percent; and y is an integer of from 0.01 to 0.5 atomic percent.

The invention will be further described in the following examples, but the invention is not meant to be limited to the details set forth therein.

EXAMPLE 1

Part A. Preparation of the sulfate precursor.

Strontium carbonate was dissolved in nitric acid to form a low pH solution, such as pH 3, and strontium sulfate was precipitated by adding sulfuric acid or ammonium sulfate. Trace impurities of transition metal ions were removed during this step.

The sulfate precipitate was filtered, dried, and slurried with solutions of Eu and Er, so that, on drying, the sulfate contained about 0.1 atomic percent of Eu and of Er ($SrSO_4$:$Eu_{0.001}$:$Er_{0.00}$).

This doubly doped sulfate was mixed with powdered polyethylene, powdered sulfur and ammonium chloride and fired at 900–1200° C. to form $SrS$:$Eu_{0.001}$:$Er_{0.00}$:$O_xCl$

EXAMPLE 2

Part A. Preparation of strontium sulfate

To 3000 ml of distilled water was slowly added an excess of 300 grams of $SrCO_3$ to form a solution. 250 Ml of nitric acid was added to dissolve all of the strontium carbonate. An excess of $SrCO_3$ was added, forming a milky solution having a pH of about 5. Magnesium metal pieces (1.5 gram) which had been cleaned in dilute nitric acid was added to the resulting $SrNO_1$ solution. The mixture was heated close to boiling (85°), stirred and allowed to cool to room temperature while stirring. A clear $SrNO_3$ solution was obtained after filtering.

180 Ml of sulfuric acid was added slowly with stirring. 600 Ml of water was added rapidly to precipitate $SrSO_4$. After digesting for 15 minutes with stirring, the vessel was covered while continuing to stir at 60° C. for two hours, and cooled.

The supernatant liquor was decanted, replaced with water two to three times and filtered. The precipitate was rinsed several times with water to remove the acid, and finally rinsed with methanol to promote drying. The precipitate was dried overnight in an oven at 100° C.

Part B. Preparation of doped strontium sulfate

Three and three-quarters mols (611.1 grams) of $SrSO_4$ as prepared in Part A was slurried three times with 200 ml water and lastly with 200 ml of ethanol. The resultant product was mixed with 0.5877 grams of europium oxide, 0.6388 grams of erbium oxide and 0.6229 grams of dysprosium oxide which had been dissolved in dilute nitric acid. The product was dried at 80° C. for 24 hours and ground. The ground material was again dried at 100° C. for 24 hours, and ground again.

The product was confirmed to be $SrSO_4$:$Eu_{0.001}$:$Er_{0.001}$:$Dy_{0.001}$.

Part C. Preparation of doped SrS

One mol or 383.898 grams of the product as prepared in Part B was mixed with 2.85 mols (83.39 grams) of polyethylene and 6.05 mols (404.62 grams) of sublimed sulfur. The mixture was added to a 1000 ml crucible. A larger crucible (2400 ml) was packed with a bottom layer of quartz wool, and the smaller crucible placed inside. A 1500 ml crucible was placed over the inside crucible as a cover. About 2 inches of charcoal was added and the mixture was fired by ramping up the temperature at a rate of 3° C./min to 440° C. and held for one hour; the temperature then was increased at a rate of 5° C./min to 1100° C. and held for two hours; and then cooled at a rate of about 2° C./min.

The resultant fired material, $SrS$:$Eu_{0.001}$$Er_{0.001}$$Dy_{0.001}$O had a medium orange color with white and black (carbon) specks in it. The product was ball milled for about 30 minutes.

Part D. Preparation of SrS:Eu:Er:Dy:OX 5.1 Grams of polyethylene was melted in a 1500 ml crucible at 150° C. for 15 minutes. 510 Grams of the ball milled product of Part C, 51 grams of sublimed sulfur and 0.51 grams of ammonium chloride was added and mixed and placed in a 750 ml crucible. Quartz wool was placed in the bottom of a 2400 ml crucible, the 750 ml crucible containing the ingredients was mounted therein, and covered with a 1500 ml crucible. The temperature was increased at about 3° C./min up to 400° C. and held for two hours; heated at a rate of 10°0 C./min up to 1100° C. and held for one hour; and the crucible cooled at a rate of about 2° C./min to room temperature. A chunk of bright orange phosphor was obtained that was ground and sieved.

Part E. Preparation of SrS:Eu:Eu:Dy:OX

Using only 10% of the amount of polyethylene and sulfur, 0.1% by weight of ammonium chloride (0.51 grams) was added to 510 grams of powdered SrS:Eu:Er:Dy and the firing regime of Part D repeated.

The resultant phosphor containing both oxygen and halide ions had a high brightness, long persistence times, in excess of 120 minutes. Due to the low firing temperatures, the phosphor did not require extensive grinding to achieve a powdered phosphor.

The presence of one or more trivalent ions is believed to assist in regulating the amount of oxygen retained in the host lattice via a strong bonding interaction between the trivalent rare earth metal and oxygen ions. This bonding interaction prevents reduction of the oxide ion concentration to levels too low to achieve good long persistence.

The invention has been described in terms of particular embodiments, but the invention is not meant to be so limited. Thus the invention is only to be limited by the scope of the appended claims.

We claim:

1. A long persistence phosphor that emits in the orange-red portion of the spectrum comprising $$AS:Eu_m:Tr_n:O_xX_y$$

wherein A is an alkaline earth metal ion; Tr is one or more trivalent rare earth metal ions; X is a halogen; m is an integer in the range of 0.01–0.5 atomic percent; n is an integer in the range 0.03 to 0.5 atomic percent; x is an integer in the range 0.01 to 2.0 atomic percent; and y is an integer in the range of 0.01 to 0.5 atomic percent.

2. A phosphor according to claim 1 wherein the alkaline earth metal is selected from the group consisting of calcium, strontium and barium.

3. A phosphor according to claim 1 wherein the halogen is selected from the group consisting of fluorine, chlorine, bromine and iodine.

4. A phosphor according to claim 1 wherein Tr is one or more trivalent rare earth metal ions selected from the group consisting of praseodymium, gadolinium, dysprosium, holmium, terbium, neodymium and erbium.

5. A phosphor according to claim 1 wherein A is strontium and X is chlorine.

6. A phosphor according to claim 1 wherein A is strontium, m and n are 0.1, x is 1 and X is chlorine.

7. A method of making a long persistence phosphor that emits in the orange-red portion of the spectrum comprising a) mixing an alkaline earth metal sulfate doped with europium and one or more trivalent rare earth metals with a hydrocarbon and sulfur in a closed refractory crucible;

b) heating the mixture slowly up to a first temperature of about 400° C. and c) heating to a final temperature of about 900–1200° C. in said crucible until the corresponding oxygen containing sulfide phosphor is formed.

8. A method according to claim 7 wherein the alkaline earth metal is selected from the group consisting of strontium, calcium and barium.

9. A method according to claim 7 wherein the trivalent rare earth metal is selected from the group consisting of one or more of praseodymium, neodymium, gadolinium, dysprosium, holmium, terbium and erbium.

10. A method according to claim 7 wherein the oxide-containing sulfide phosphor is heated with a halogen compound to form the corresponding halide and oxide-containing phosphor.

11. A method according to claim 7 wherein after step c), the phosphor is ground, mixed with a hydrocarbon and sulfur in a closable crucible and steps b) and c) are repeated.

* * * * *